(12) United States Patent
Park et al.

(10) Patent No.: US 7,202,924 B1
(45) Date of Patent: Apr. 10, 2007

(54) LIQUID CRYSTAL DISPLAY AND A FABRICATING METHOD THEREOF

(75) Inventors: Sung-Il Park, Anyang-shi (KR); In-Byeong Kang, Kumi-shi (KR); Sung-Su Lee, Kumi-shi (KR); Yu-Ho Jung, Kumi-shi (KR); Kwang-Seop Park, Kumi-shi (KR)

(73) Assignee: LG.Philips LCD Co., Ltd, Seoul (KR)

( * ) Notice: Subject to any disclaimer, the term of this patent is extended or adjusted under 35 U.S.C. 154(b) by 0 days.

(21) Appl. No.: 09/510,300

(22) Filed: Feb. 22, 2000

(30) Foreign Application Priority Data

| Mar. 17, 1999 | (KR) | 99-9018 |
| Mar. 17, 1999 | (KR) | 99-9020 |
| Mar. 17, 1999 | (KR) | 99-9021 |

(51) Int. Cl.
*G02F 1/1333* (2006.01)

(52) U.S. Cl. .................. 349/110; 349/187; 349/106

(58) Field of Classification Search .................. 349/44, 349/106, 110, 111, 43, 143, 139, 138, 187
See application file for complete search history.

(56) References Cited

U.S. PATENT DOCUMENTS

| 5,358,810 A | * | 10/1994 | Yoshino ........................ 430/20 |
| 5,426,523 A |   | 6/1995  | Shimada et al. ............... 359/54 |
| 5,510,916 A |   | 4/1996  | Takahashi |
| 5,600,461 A |   | 2/1997  | Ueda et al. |
| 5,641,974 A | * | 6/1997  | den Boer et al. ............. 257/59 |
| 5,659,375 A | * | 8/1997  | Yamashita et al. ............ 349/38 |
| 5,744,821 A |   | 4/1998  | Song ............................ 257/59 |
| 5,780,871 A |   | 7/1998  | Den Boer et al. |
| 5,781,253 A | * | 7/1998  | Koike et al. ................... 349/40 |
| 5,781,260 A |   | 7/1998  | Miyazawa |
| 5,815,226 A |   | 9/1998  | Yamazaki et al. |
| 5,847,792 A | * | 12/1998 | Kobayashi et al. ......... 349/110 |
| 5,870,157 A | * | 2/1999  | Shimada et al. ............ 349/106 |
| 5,877,830 A | * | 3/1999  | Shimada et al. ............ 349/110 |
| 5,917,571 A | * | 6/1999  | Shimada ...................... 349/138 |
| 5,953,088 A | * | 9/1999  | Hanazawa et al. .......... 349/110 |
| 6,038,002 A | * | 3/2000  | Song ............................ 349/43 |
| 6,208,399 B1| * | 3/2001  | Ohta et al. .................. 349/139 |

(Continued)

FOREIGN PATENT DOCUMENTS

| DE | 198 28 591 A1 | 6/1998 |

(Continued)

*Primary Examiner*—Dung T. Nguyen
*Assistant Examiner*—Thoi V. Duong
(74) *Attorney, Agent, or Firm*—McKenna Long & Aldridge LLP

(57) ABSTRACT

The present invention relates to a liquid crystal display and a fabricating method thereof which prevent light leakage occurs near data lines in accordance with the rubbing direction of an alignment film. The present invention includes a thin film transistor plate having a gate line, a data line, a gate electrode, a thin film transistor, a passivation layer, and a pixel electrode, a color filter plate including a black matrix, a color filter and a common electrode on a second transparent substrate, and liquid crystals injected and sealed between the thin film transistor plate and the color filter plate, wherein the black matrix of the color filter plate is overlapped asymmetrically with the data line of the thin film transistor plate.

16 Claims, 17 Drawing Sheets

U.S. PATENT DOCUMENTS 6,300,987 B1 * 10/2001 Jung .......................... 349/39
6,388,721 B1 * 5/2002 Murade ....................... 349/44
6,400,427 B1 * 6/2002 Hanazawa et al. ............ 349/44
6,603,524 B1 8/2003 Shimada et al.

FOREIGN PATENT DOCUMENTS

| | | |
|---|---|---|
| EP | 668 526 | 8/1995 |
| EP | 745 885 | 12/1996 |
| FR | 2752988 | 3/1998 |
| JP | 10-104664 | 4/1998 |
| JP | 10-260430 | 9/1998 |

* cited by examiner

| Overlapped Width | 0 | 0.5 | 1 | 1.5 | 2 | 2.5 | 3 |
|---|---|---|---|---|---|---|---|
| Width of data line | 8 | 8 | 8 | 8 | 8 | 9 | 10 |
| End point of data line | 20 | 20 | 20 | 20 | 20.5 | 20.5 | 21 |
| Transmission of light 0.35≥ | 22.25 | 22 | 21.5 | 21 | 20.5 | 20.5 | 20.5 |
| Maximum value of the opening ratio | 2.25 | 2 | 1.5 | 1 | 0.5 | 0 | -0.5 |

LIQUID CRYSTAL DISPLAY AND A FABRICATING METHOD THEREOF

This application claims the benefit of Korean Patent Application Nos. 1999-9018, 1999-9020, and 1999-9021, each filed on Mar. 17, 1999, and each of which is hereby incorporated by reference for all purposes as if fully set forth herein.

BACKGROUND OF THE INVENTION

1. Field of the Invention

The present invention relates to a liquid crystal display, and a method of fabricating a liquid crystal display, which prevents light leakage from occurring near data lines in accordance with the rubbing direction of an alignment film.

2. Discussion of Related Art

A TFT-LCD (thin film transistor-liquid crystal display) is comprised of a TFT array plate in which a plurality of TFT's and pixel electrodes are arranged, a color filter plate consisting of color filters and common electrodes, and liquid crystal filling up a space between the TFT array and color filter plates. Both plates are equipped with alignment films as well as attached polarizing plates which polarize visible rays.

A TFT-LCD having the above-mentioned structure has an advantage merit in power consumption, compared to a cathode ray tube (CRT). Particularly, power consumption is the most important factor in a portable TFT-LCD.

Efficiency of a back light is reduced greatly during passing through a polarizing plate and color filters. For instance, only 38% of light energy penetrates through a commercial polarized plate, and 40% of light energy permeability of penetrates through color filters, and the contrast and color reproductivity are reduced if light energy the polarizing plate and color filters are increased. Instead, it is more efficient to increase the opening ratios which is the ratio of area which permits the transmission of light in a unit cell.

Figure 5A:
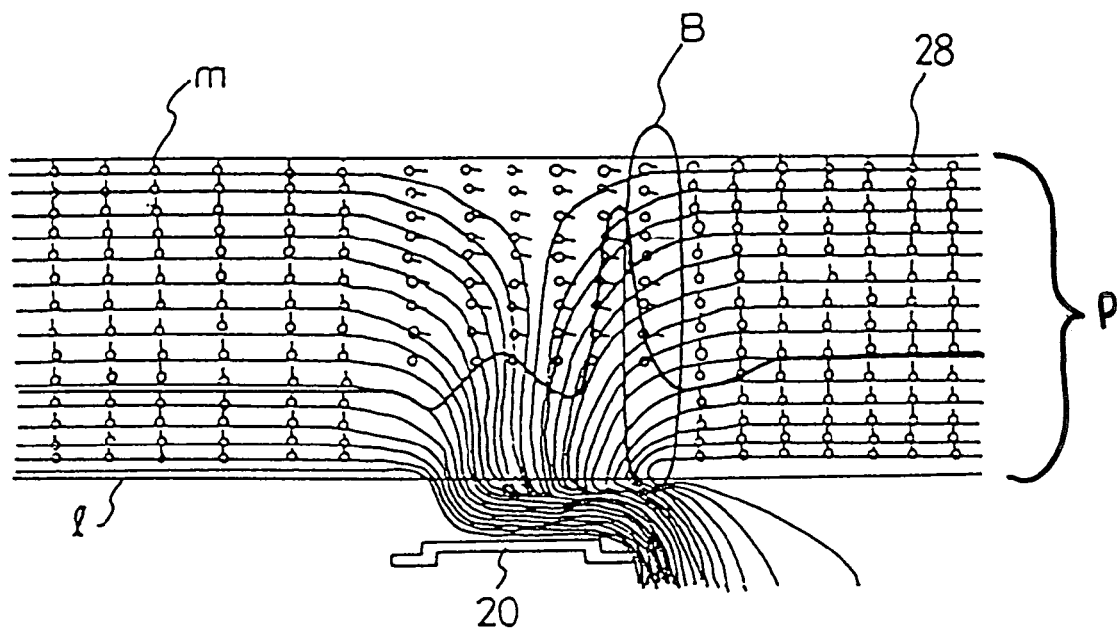
Figure 5B:
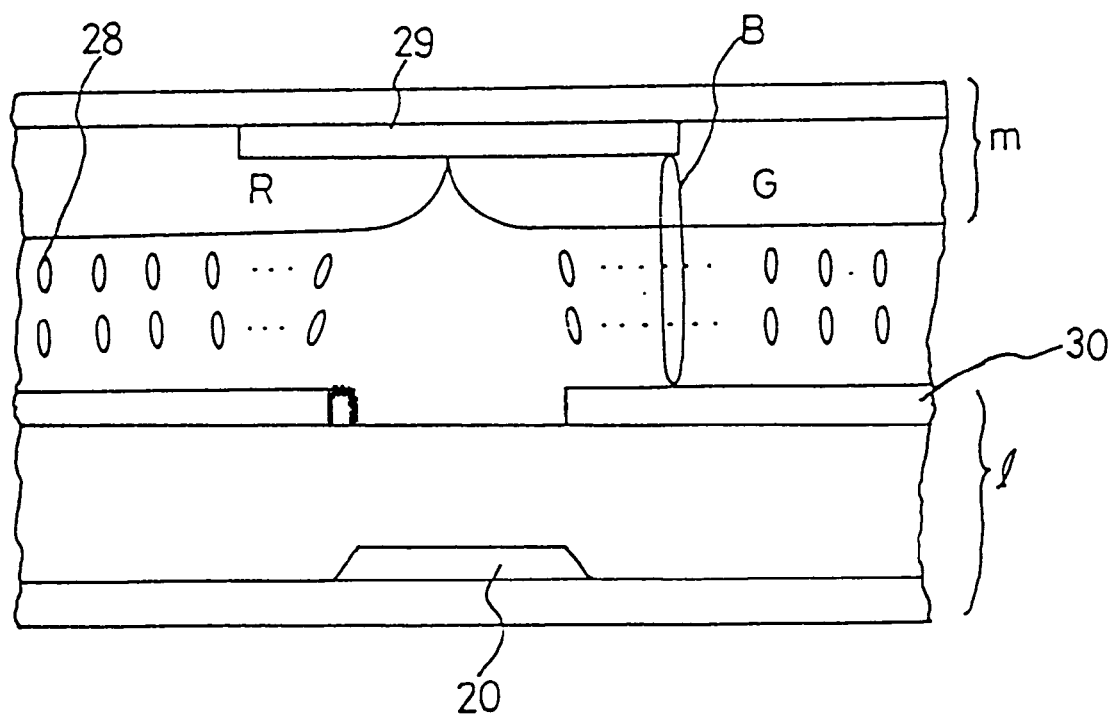

FIG. 5A shows a graph of equipotential potential lines between a TFT array plate and a color filter plate in an LCD according to a related art, wherein a predetermined voltage is applied to the plates. FIG. 5A also shows potential difference and the generation of light-leakage region B on data lines when light is cut off by liquid crystals between both plates. FIG. 5B shows a cross-sectional view of an LCD where a light leakage region is generated, which points out a problem of the related art.

Figure 1:
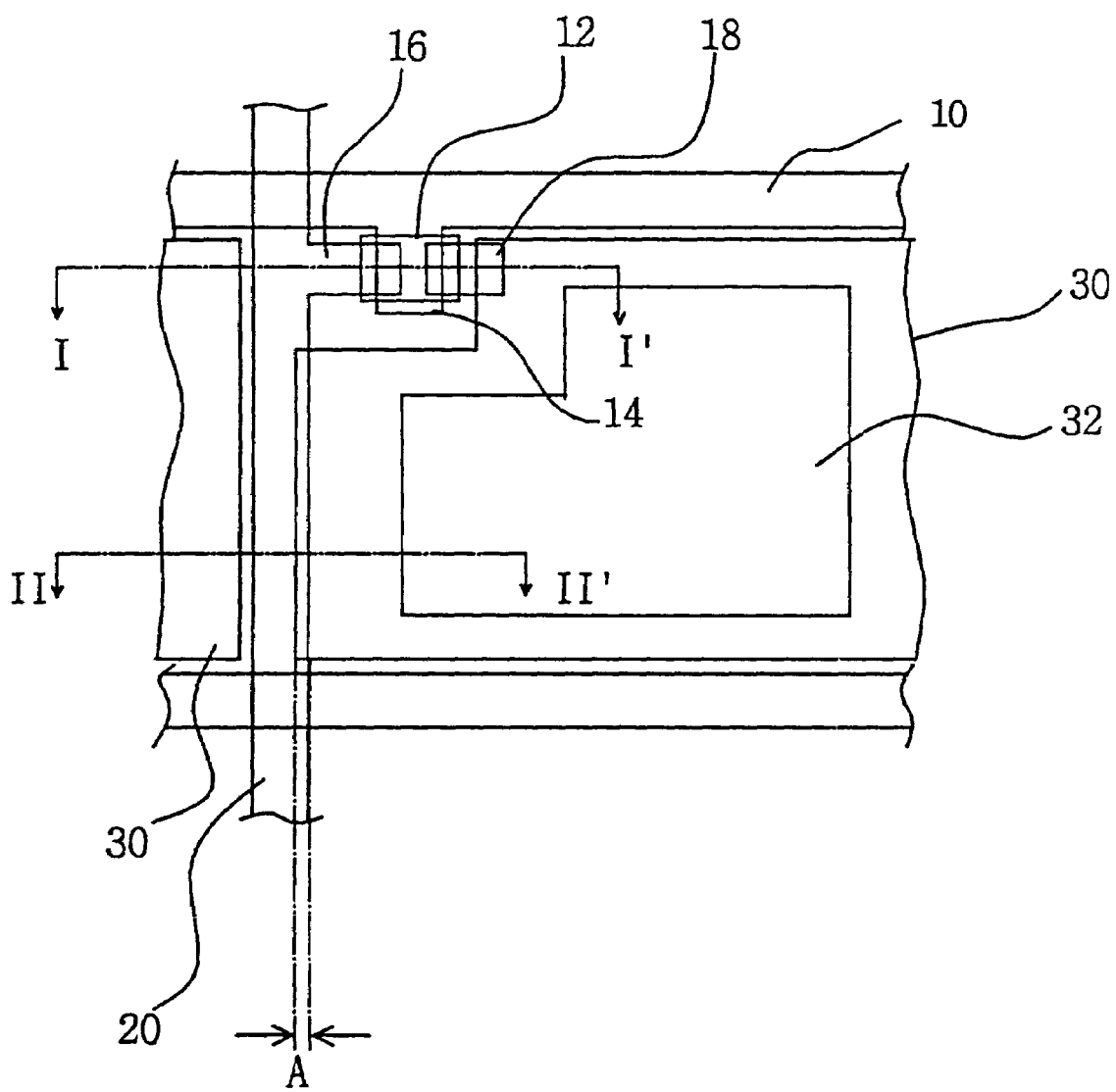
FIG. 1 shows a layout of a unit pixel of a conventional TFT-LCD.
Figure 2:
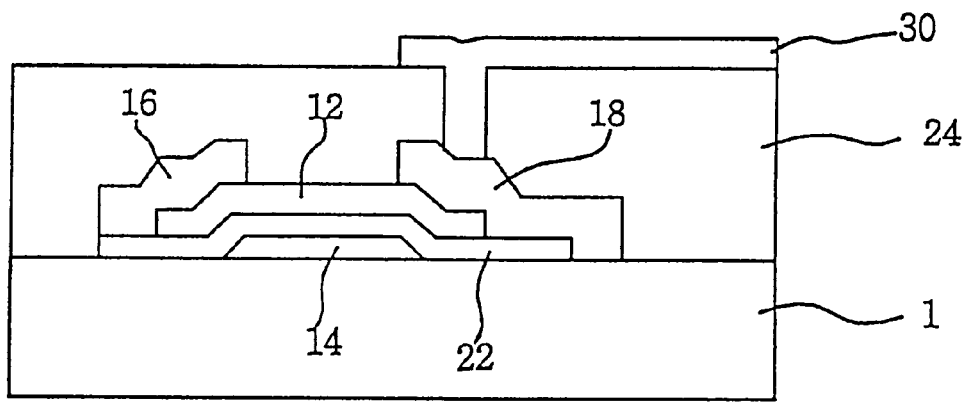
FIG. 2 is a cross-sectional view of an LCD having a TFT with an inverse staggered structure according to a related art, which is bisected through the line I–I' in FIG. 1.
Figure 3:
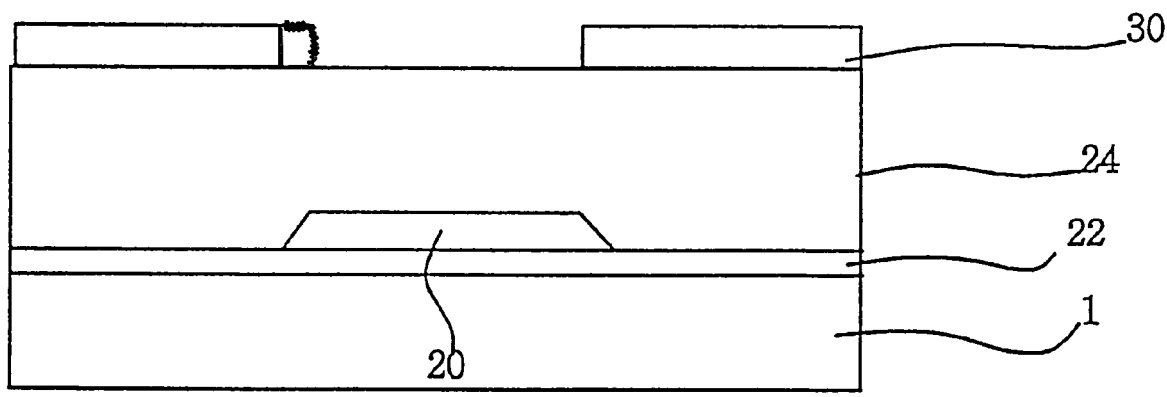
FIG. 3 shows a cross-sectional view bisected through the line II–II' in FIG. 1.

Referring to FIG. 1 to FIG. 3, gate lines 10 are formed in a horizontal direction on a transparent substrate 1, which is a TFT array plate on which TFT's and pixel electrodes are arranged. Data lines 20, crossing the gate lines 10, are arranged in a perpendicular direction to the gate lines 10.

A gate electrode 14, extending from the gate line 10, is formed protruding in the same direction as the data line 20.

An active layer 12, beneath which a gate insulating layer 22 lies, is formed on the gate electrode 14. A channel region is defined in the portion of the active layer 12 corresponding to the gate electrode 14. At either side of the channel region in the active layer 12, a source region and a drain region are each defined.

A source electrode 16, connected to the source region of the active layer, and a drain electrode 18, connected to the drain region of the active layer, are formed in the same direction as the gate line 10 is aligned. The source electrode 16 and drain electrode 18 each protrude from the data line 20.

A passivation layer 24 covers the above structure. A contact hole exposing the drain electrode 18 is formed in the passivation layer 24. And, a pixel electrode 30 which is connected to the drain electrode 18 and covers the contact hole is formed on the passivation layer 24.

The pixel electrode 30, beneath which the passivation layer 24 lies on the data line 20, may have a structure such that the pixel electrode 30 partially overlaps the data line 20 and generally the width of the overlapped area, which is designated by the reference sign "A", is under 1.5 μm, in order to increase the opening ratio. The reference numeric 32 indicates an opening of a black matrix (hereinafter abbreviated BM) 29 of a color filter plate m which is shown in FIGS. 5A–B. Light rays are actually transmitted through the opening.

A process of fabricating an LCD having the above-described structure according to a related art is explained in the following description.

Figure 4A:
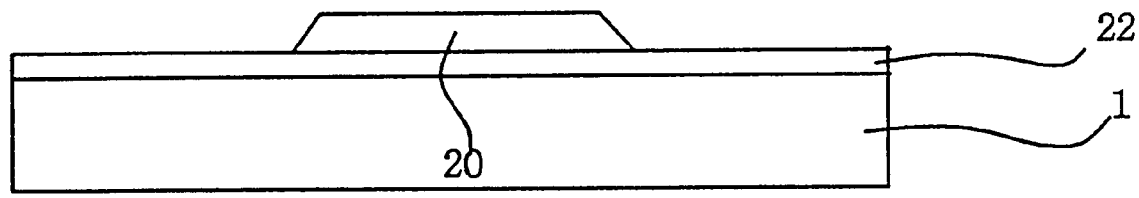
FIGS. 4A to 4C show cross-sectional views, which are bisected through the line II–II' in FIG. 1, illustrating fabrication of an LCD according to a related art.

Referring to FIG. 1, FIG. 2 and FIG. 4A, after a metal layer has been formed by sputtering Al, Mo or the like on a transparent substrate 1 such as glass, in which gate and data lines are defined, gate lines 10 are formed by patterning the metal layer. In this case, a gate electrode 14 is also patterned which protrudes from the gate line 10 as soon as the gate line 10 is patterned.

After a gate insulating layer 22 is formed to cover the gate electrode 14, an intrinsic amorphous silicon layer and a silicon layer to which an impurity such as P is added to work as an ohmic contact layer are deposited successively, and an active layer is formed by patterning the amorphous silicon layer and the impurity-contained silicon layer.

After a metal layer is formed on the above structure, data lines 20 are patterned by etching the metal layer. When the data lines 20 are patterned, source and drain electrodes 16 and 18 connected to the source and drain regions respectively are also patterned. The source and drain electrodes 16 and 18 are arranged to overlap the gate line 10.

Although not shown in the drawing, the impurity-containing silicon layer is etched using of the source and drain electrode patterns as a mask to divide the ohmic contact layer inserted between the active layer and the source/drain electrodes 16 and 18, into the portions for the source and drain electrodes.

Figure 4B:
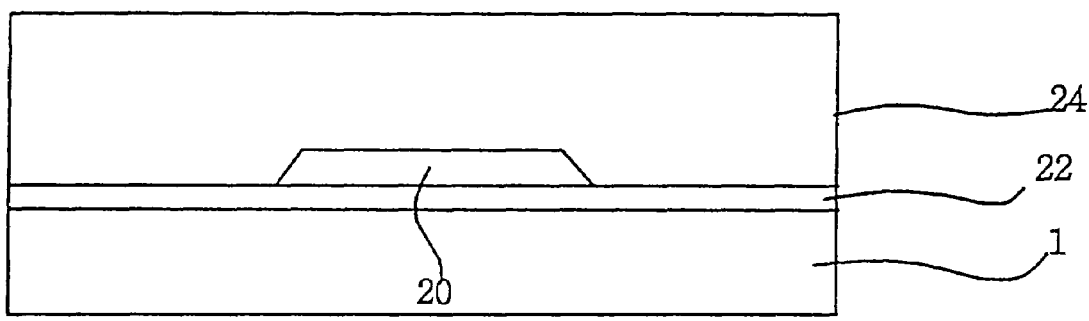

Referring to FIG. 2 and FIG. 4B, a passivation layer 24 is formed on the above structure by depositing by CVD an insulating layer of silicon nitride or the like which has a low dielectric constant.

Figure 4C:
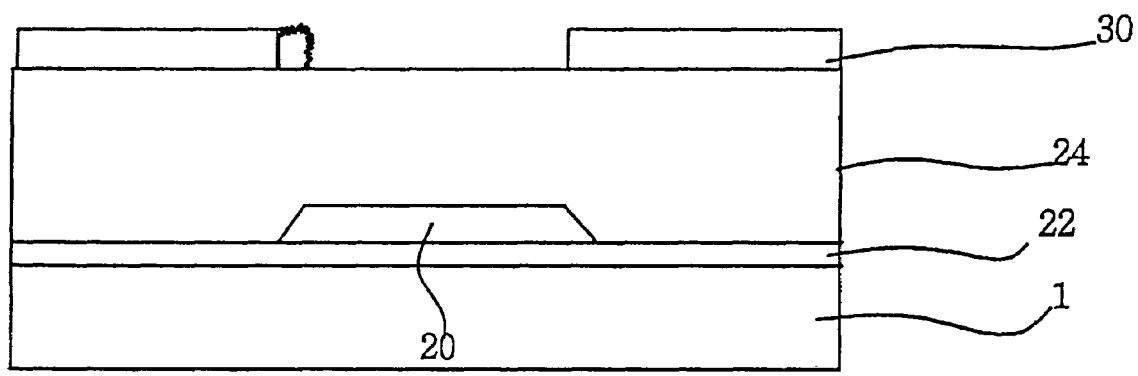

Referring to FIG. 2 and FIG. 4C, a contact hole exposing the drain electrode 18 is formed in the passivation layer 24.

After ITO (Indium Tin Oxide) has been deposited on the passivation layer 24, a pixel electrode 30 is formed by patterning the ITO to be connected to the drain electrode 18. The pixel electrode 30, as mentioned in the above explanation, has a structure overlapping with the data line 20. The width of the overlapped area A is less than about 1.5 μm.

Thus, a TFT array plate, on which TFT's and pixel electrodes are arranged according to a related art, is completed.

Referring to FIG. 5B, after liquid crystals 28 have been injected between the TFT array plate $l$ and the color filter plate m in which color filters and black matrix 29 are fabricated, an LCD according to the related art is completed by carrying out a sealing process. An alignment film (not shown in the drawing) is formed on the color filter plate m and the TFT array plate $l$.

Liquid crystals between the color filter and TFT array plates are aligned uniformly by carrying out a process of rubbing the alignment film with cloth.

It has been known that the LCD of the related art which has the above-mentioned structure normally has no problem of light leakage, as the data line and the pixel electrode overlap each other partially. Unfortunately, however, when voltage is applied between the color filter and TFT array plates m and $l$ the light leakage problem does exist if that the overlap area between the data line and the pixel electrode is under 1.5 μm, as explained herein with reference to FIG. 5A and FIG. 5B.

FIGS. 5A and 5B show a pattern of cutting off light due to the liquid crystal function when voltage is applied between the color filter and TFT array plates m and $l$ which operate in a normally white mode, wherein the data line 20 is overlapped by the pixel electrode 30 to a width of 1.5 μm in the TFT array plate of the related art. Curves between both plates m and $l$ are equipotential lines. Liquid crystals react with the equivalent potential lines perpendicularly for the most part while the curves are slanted on the data line 20, due to the potential difference. FIG. 5A also shows the graph "P" indicating the permeability of light in the device.

Referring to FIG. 5A, when voltage is applied between both plates m and $l$ the equipotential lines are deeply distorted, as the data line voltage influences the voltage applied to the liquid crystals. This influence distorts the working orientation of the liquid crystals to be slanted, and also generates a region in which the light permeability is abruptly increased. This region lies on the pixel electrode and extends 1 μm to 2 μm away from the area which is overlapped with the data line 20. In other words, the region includes the area overlapped with the data line 20, and the area designated by the reference indicator B in FIGS. 5A–B.

But, all of the above-mentioned light-transmitting region, which is the part with the permeability peak in the graph "P" in FIG. 5A, does not influence the image quality. Namely, the overlap region (1.5 μm), at which the data line and the pixel electrode overlap each other, does not influence the image quality directly, as the area is overlapped so as not to transmit the light. The other region B, in which the data line is not overlapped by the pixel electrode, actually transmits the light to have an effect on the image quality.

The above light leakage region B, which has no relation with the polarity of the voltage applied to the pixel electrode adjacent to the data line, may be generated at the right or left in accordance with the rubbing direction of the alignment film.

Unfortunately, the product quality is reduced due to the generation of the light leakage region which is produced by the transmission of light through the area B separated from the overlap area of 1.5 μm, between the data line and the pixel electrode, where the liquid crystals take on a slanted orientation because of the potential difference.

SUMMARY OF THE INVENTION

Accordingly, the present invention is directed to a liquid crystal display, and a fabricating method thereof, that substantially obviate one or more of the problems due to limitations and disadvantages of the related art.

An object of the present invention is to provide a liquid crystal display which prevents the transmission of light generated from parts of data lines in accordance with the direction in which an alignment film is rubbed.

Another object is to provide a method of fabricating a liquid crystal display which prevents the transmission of light generated from the parts of data lines in accordance with the direction of rubbing an alignment film.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect the present invention includes: a thin film transistor plate having a gate line, a data line, a gate electrode, a thin film transistor, a passivation layer, and a pixel electrode; a color filter plate including a black matrix, a color filter and a common electrode on a second transparent substrate; and liquid crystals injected and sealed between the thin film transistor plate and the color filter plate, wherein the black matrix of the color filter plate asymmetrically overlaps the data line of the thin film transistor plate.

The thin film transistor plate further includes: a gate line on a first transparent substrate; a data line arranged to cross the gate line wherein the gate line is insulated from the data line; a gate electrode at the area where the gate line and data line cross, wherein the gate electrode protrudes from the gate line; a thin film transistor having a source electrode connected to the data line and a drain separated from the source electrode, wherein the source and drain electrodes confront each other; a passivation layer covering the thin film transistor, wherein a contact hole exposing a portion of the drain electrode is formed in the passivation layer; and a pixel electrode partially overlapping the data line, wherein the pixel electrode is formed on the passivation layer and is connected to the drain electrode through the contact hole.

In another aspect, the present invention includes: a thin film transistor plate having a gate line, a data line, a gate electrode, a thin film transistor, a passivation layer, and a pixel electrode; a color filter plate including a black matrix, a color filter and a common electrode on a second transparent substrate; and liquid crystals injected and sealed between the thin film transistor plate and the color filter plate, wherein the pixel electrode asymmetrically overlaps two data lines, one at each end respectively.

In a further aspect, the present invention includes: a thin film transistor plate having a gate line, a data line, a gate electrode, a thin film transistor, a passivation layer, and a pixel electrode; a color filter plate including a black matrix, a color filter and a common electrode on a second transparent substrate; and liquid crystals injected and sealed between the thin film transistor plate and the color filter plate, wherein a cut-off film which is asymmetrically overlapped by data line, and is partially overlapped by the pixel electrode, is formed under the data line.

In a further aspect, the present invention includes a method of fabricating a liquid crystal display having a transparent substrate on which a gate line region and a data line region are defined, wherein the method includes the steps of: forming a gate line in the gate region, wherein a gate electrode which protrudes from the gate line, and a cut-off film which is overlapped asymmetrically by the data line region, are formed simultaneously; forming a data line in the data line region on the transparent substrate, wherein the data line crosses and is insulated from the gate line, and wherein a source electrode at one side of the data line and a drain electrode which confronts and is isolated from the source electrode are formed; forming a passivation layer covering the above structure, wherein a contact hole exposing a portion of the drain electrode is formed in the passivation layer; and forming a pixel electrode connected to the drain electrode through the contact hole on the passivation layer, wherein the pixel electrode partially overlaps the cut-off film.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this application, illustrate embodiments of the invention and together with the description serve to explain the principle of the invention.

Figure 6:
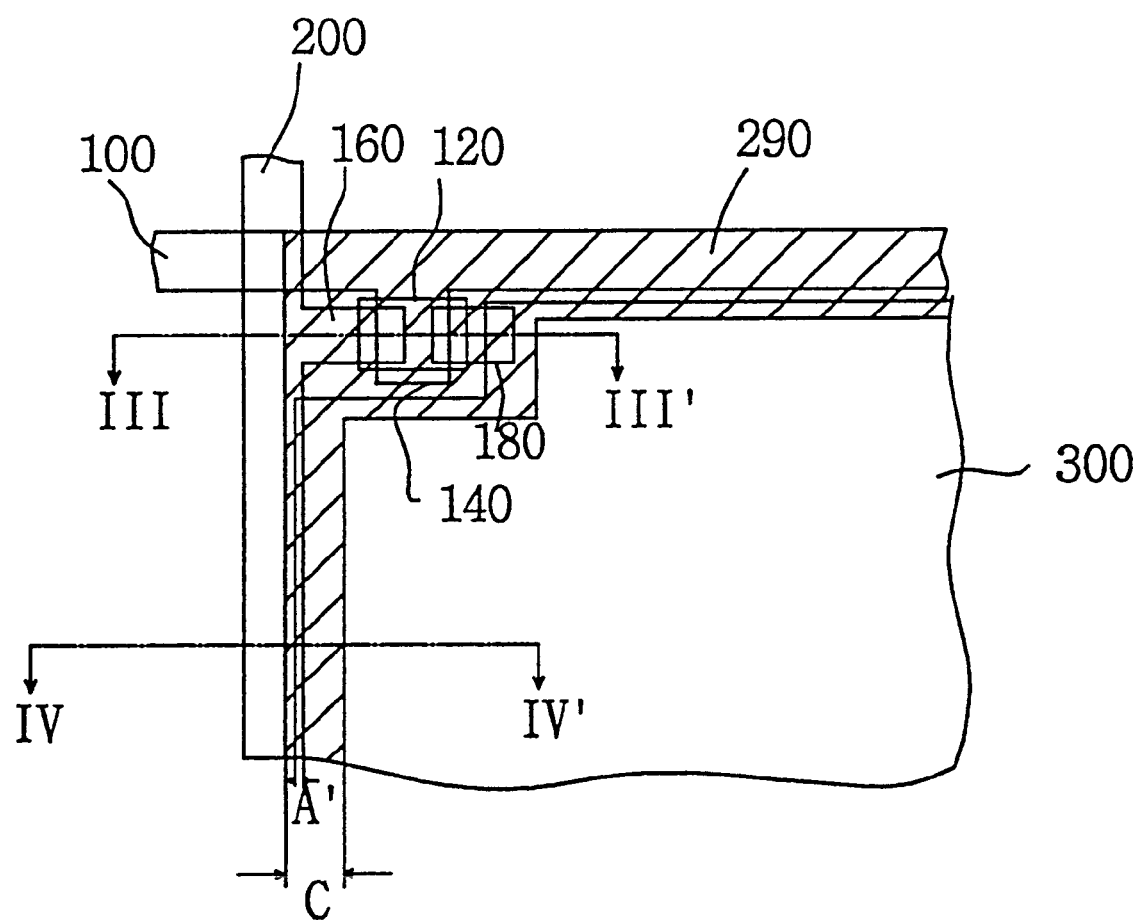
Figure 7:
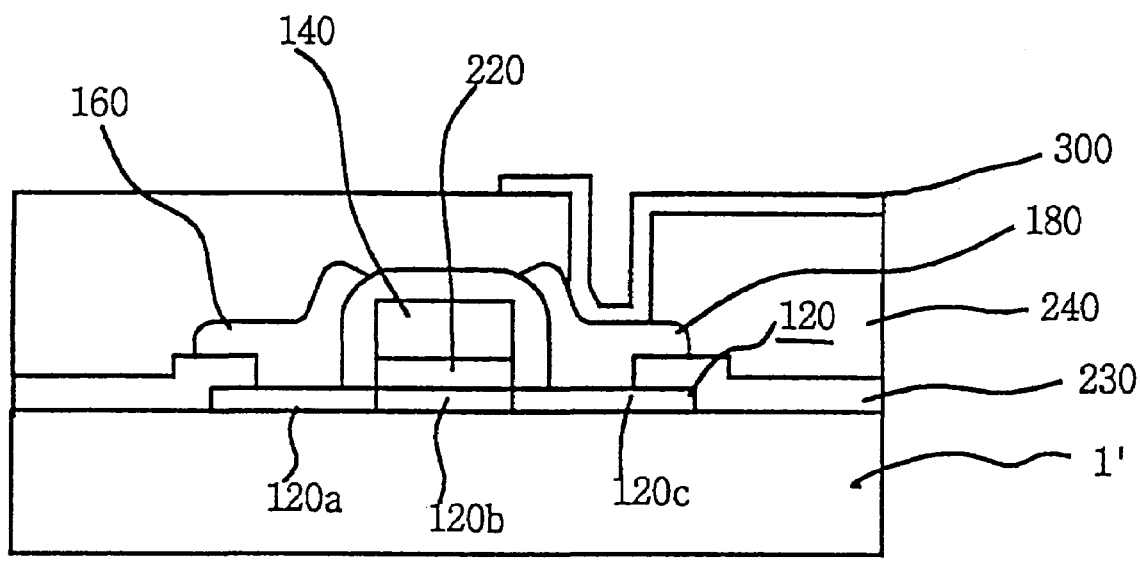
Figure 8:
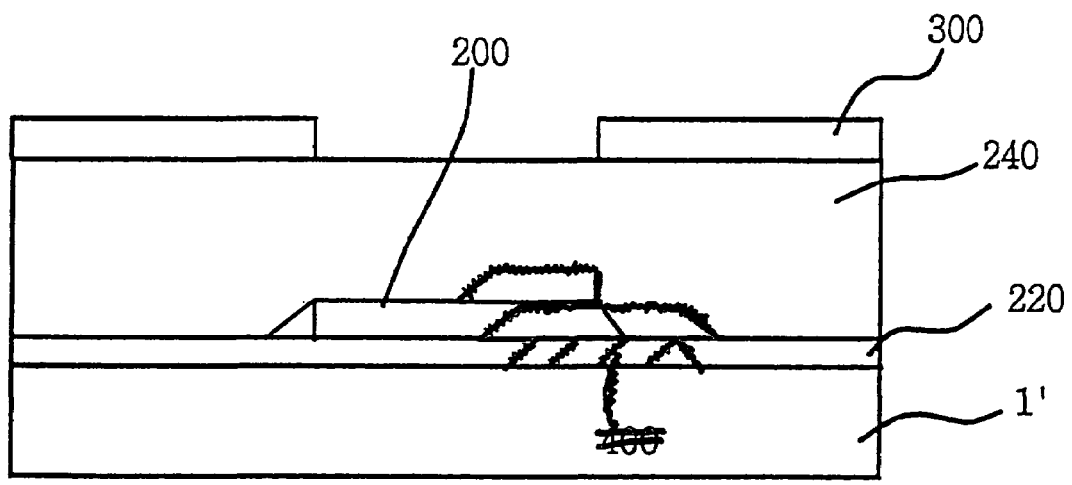
Figure 9:
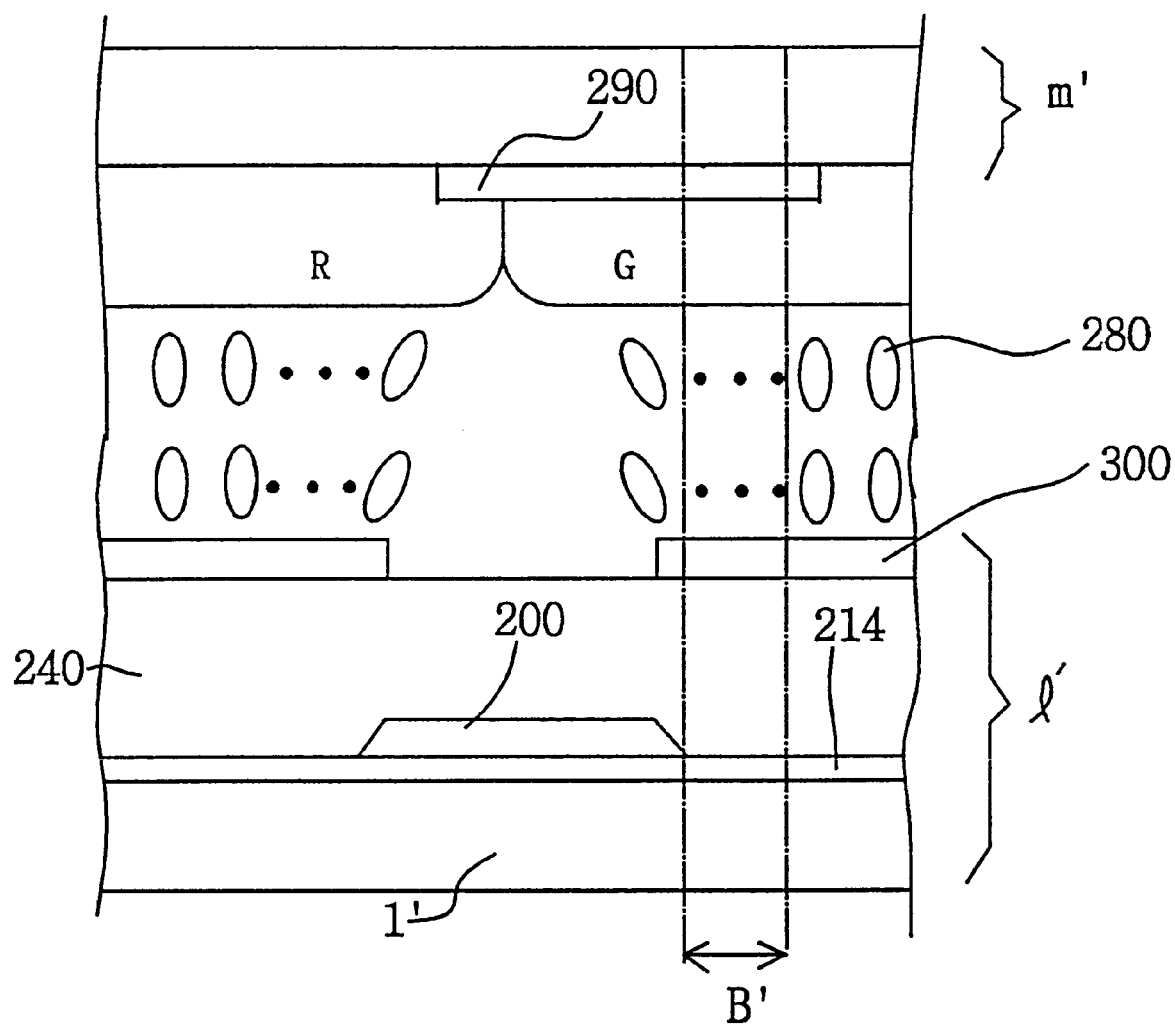
Figure 10:
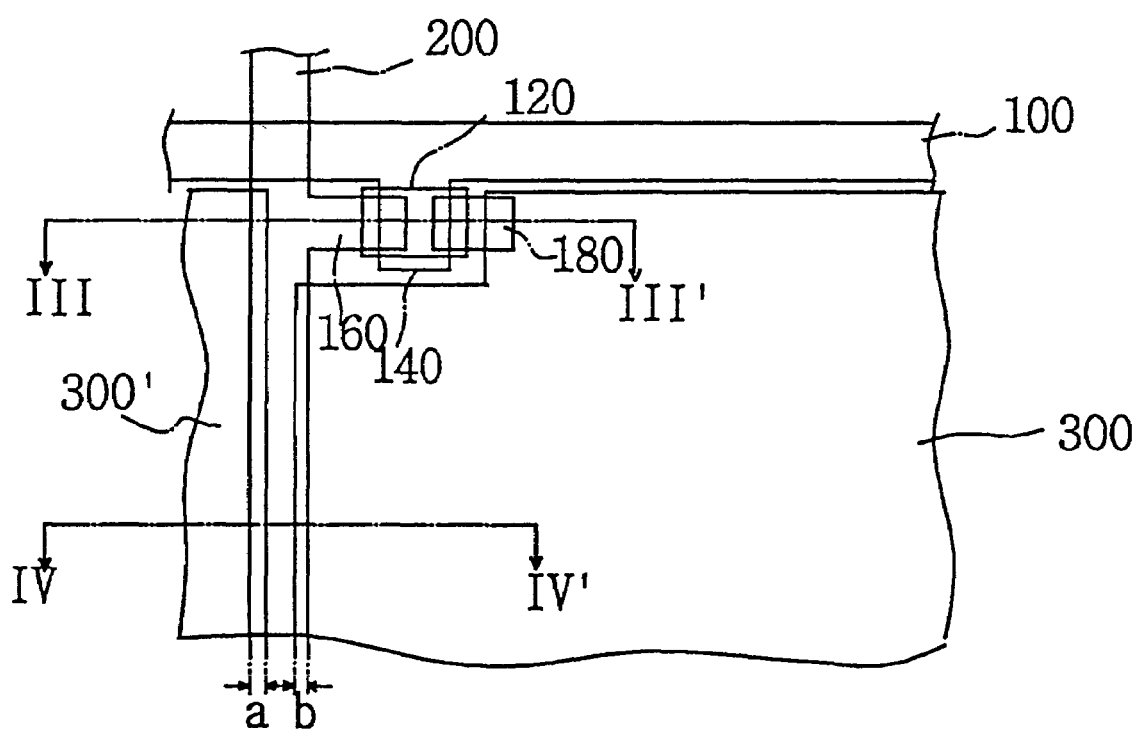
Figure 11:
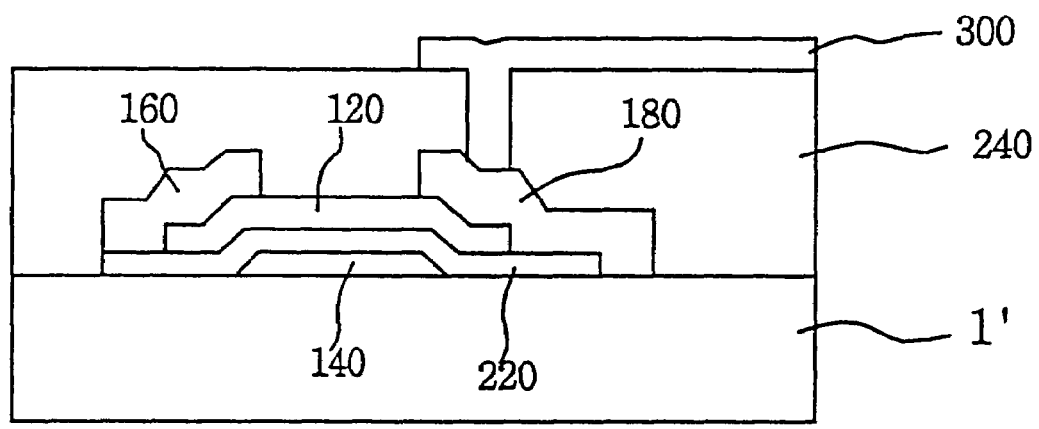
Figure 12:
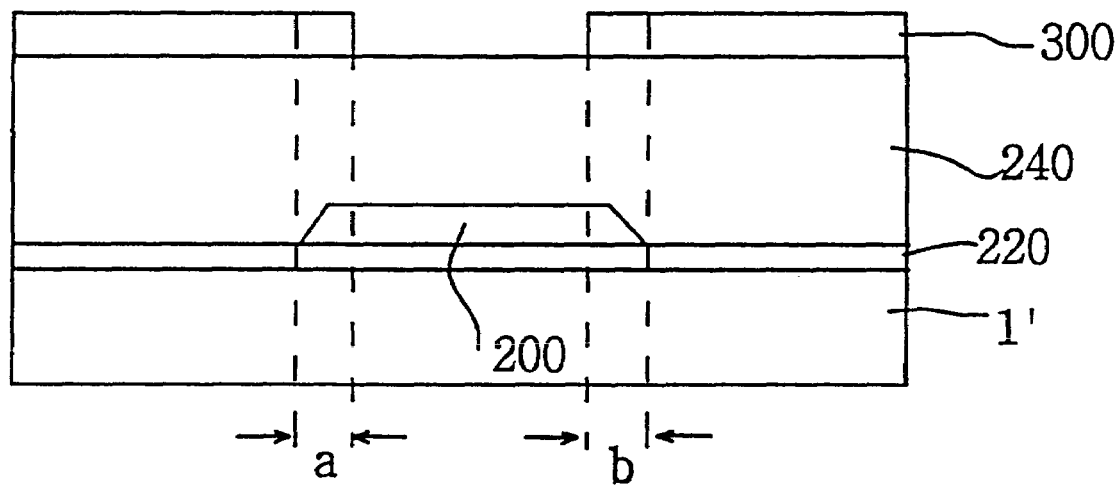
Figure 13A:
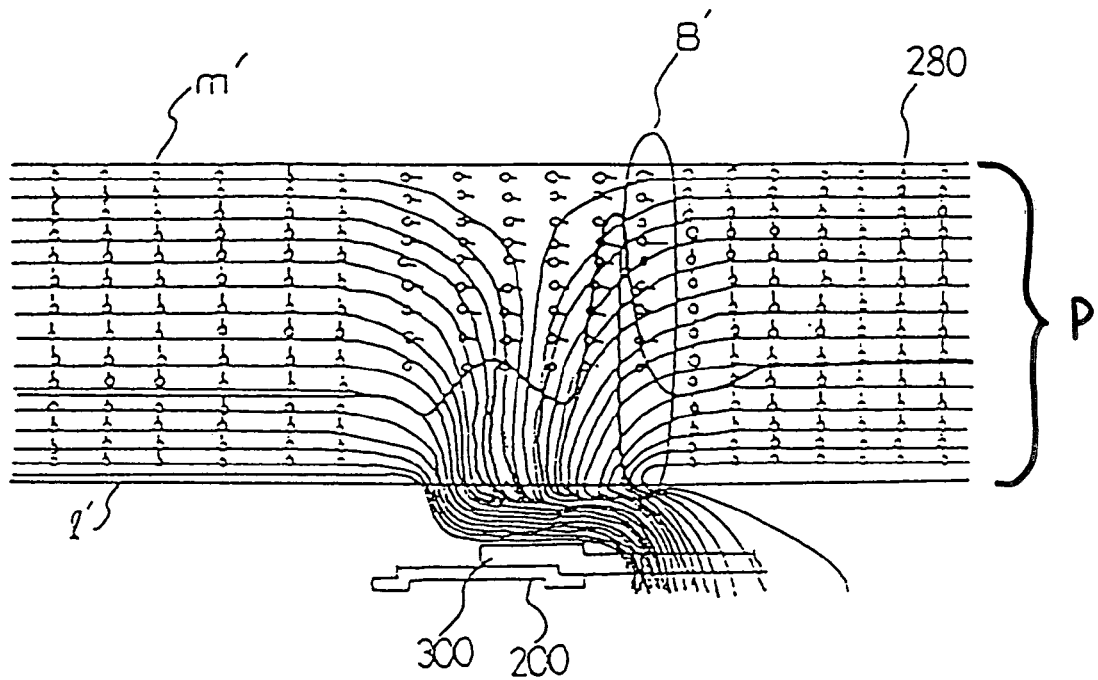
Figure 13B:
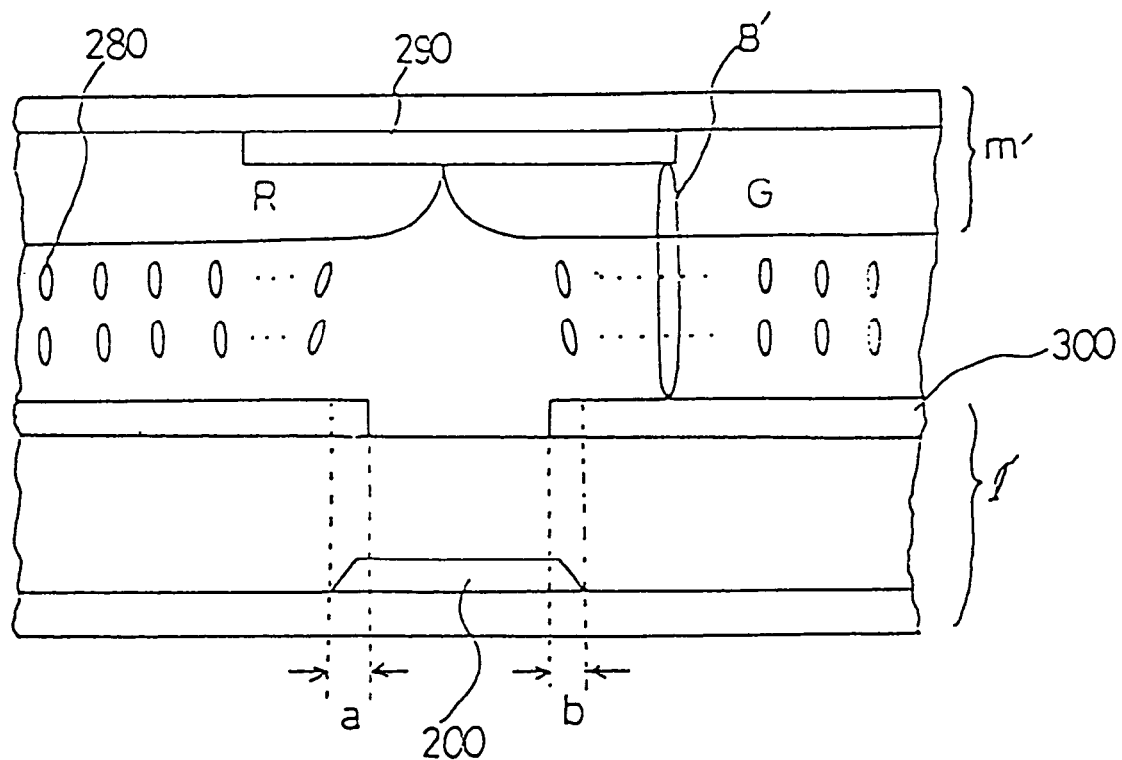
Figure 14:
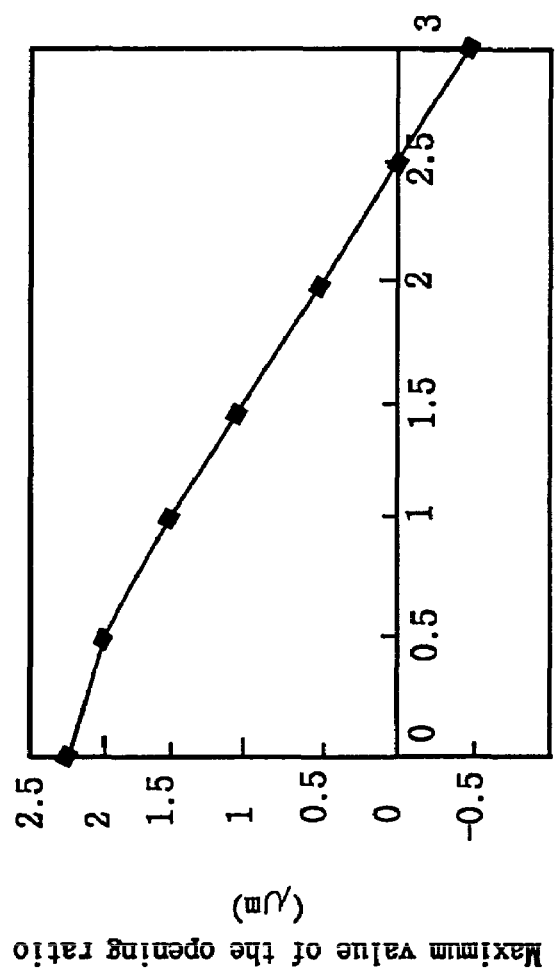
Figure 15:
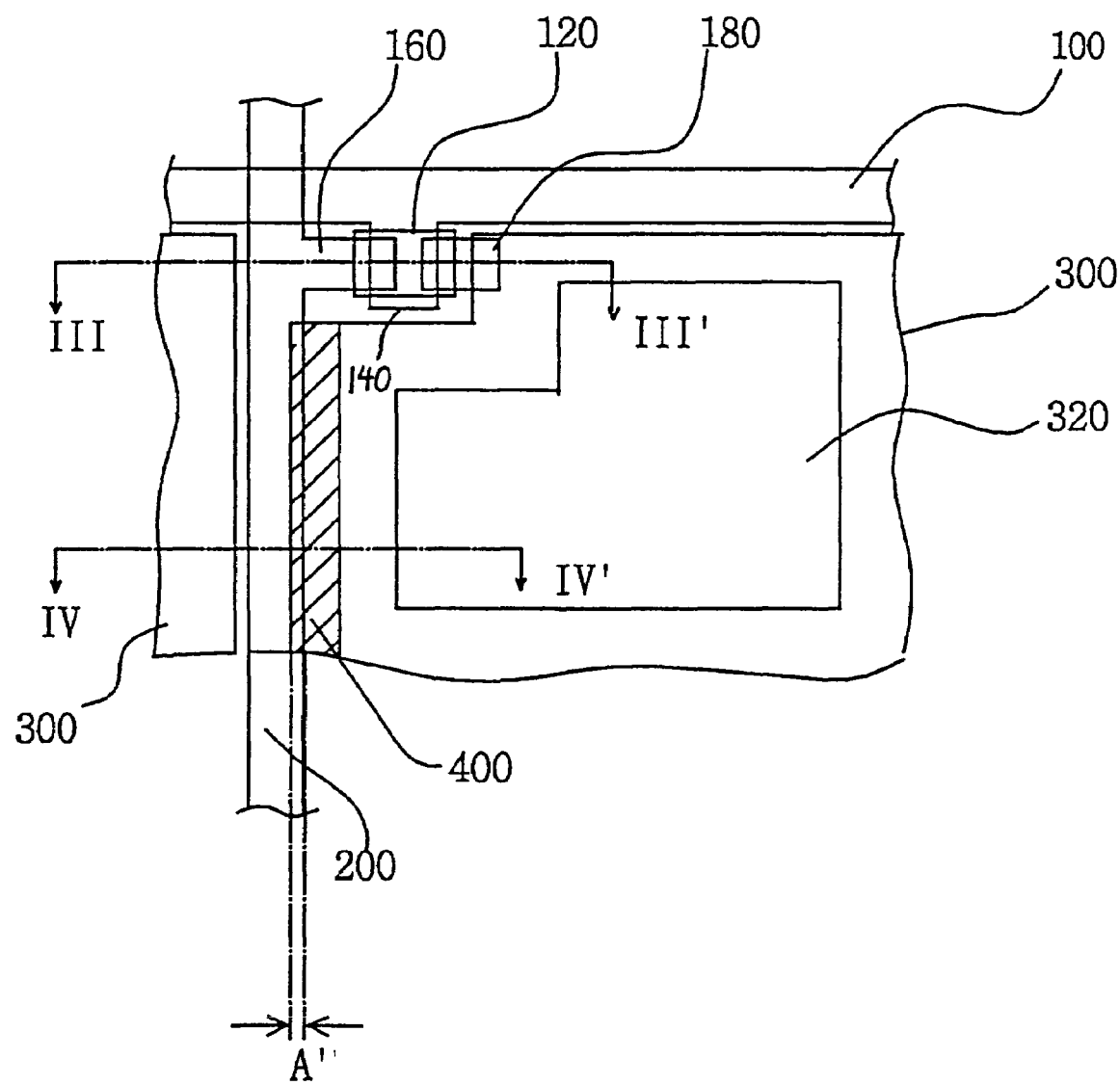
Figure 16:
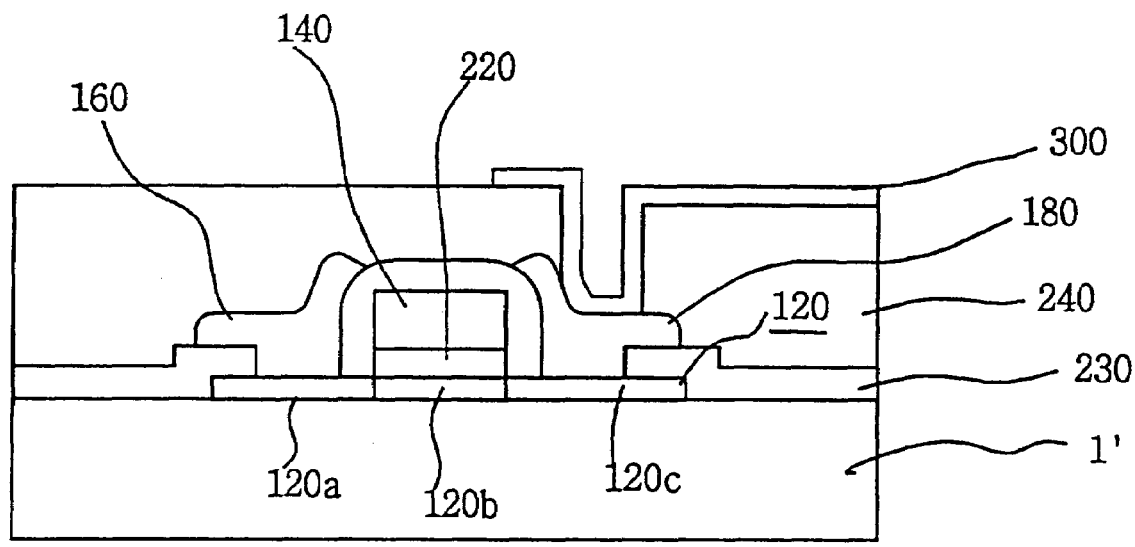
Figure 17:
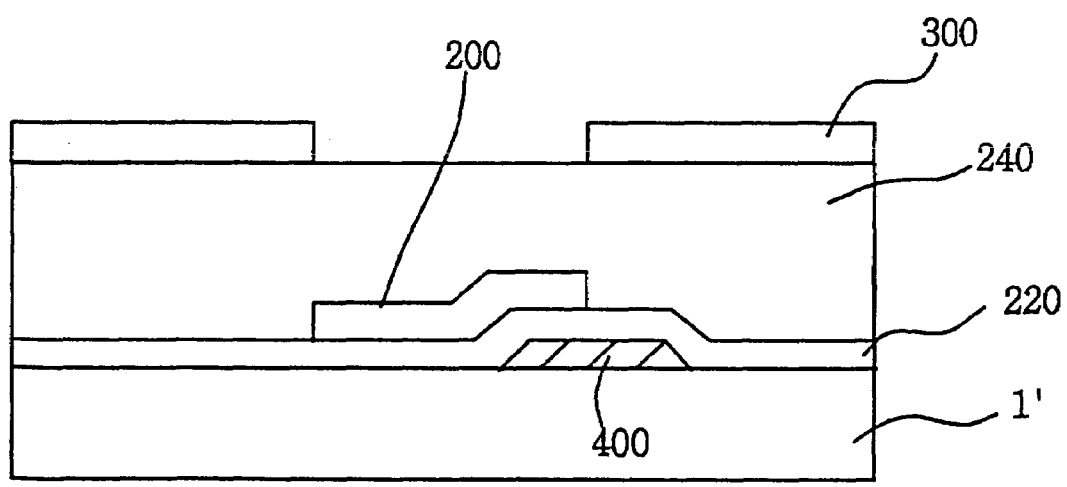
Figure 18A:
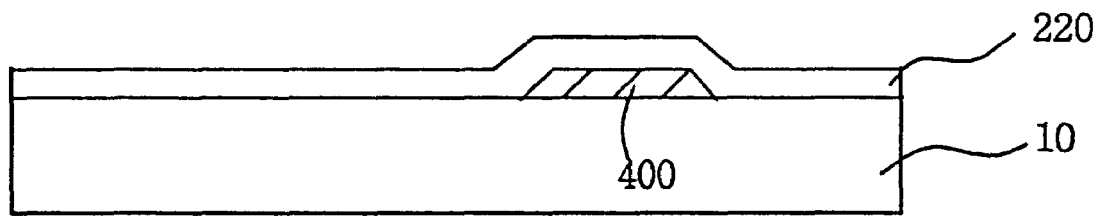
Figure 18B:
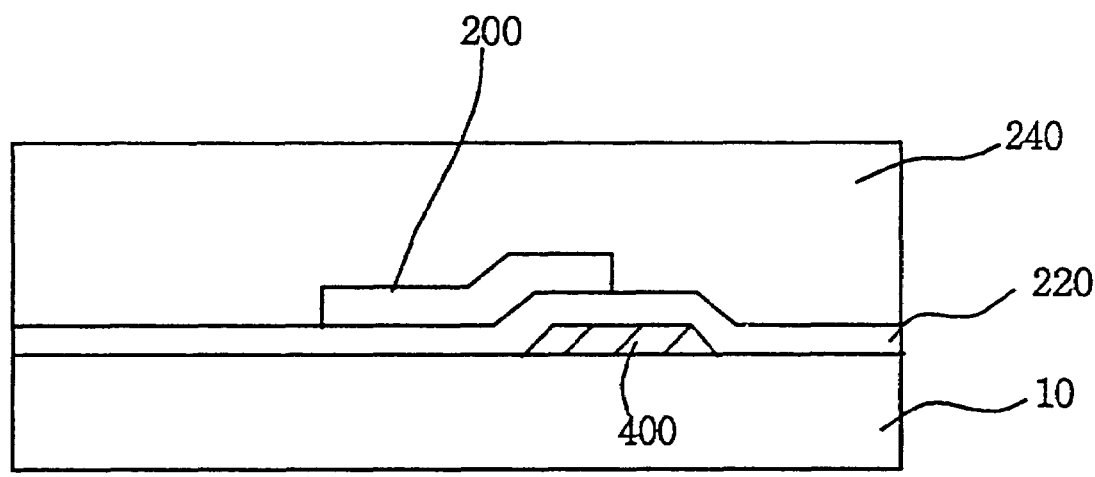
Figure 18C:
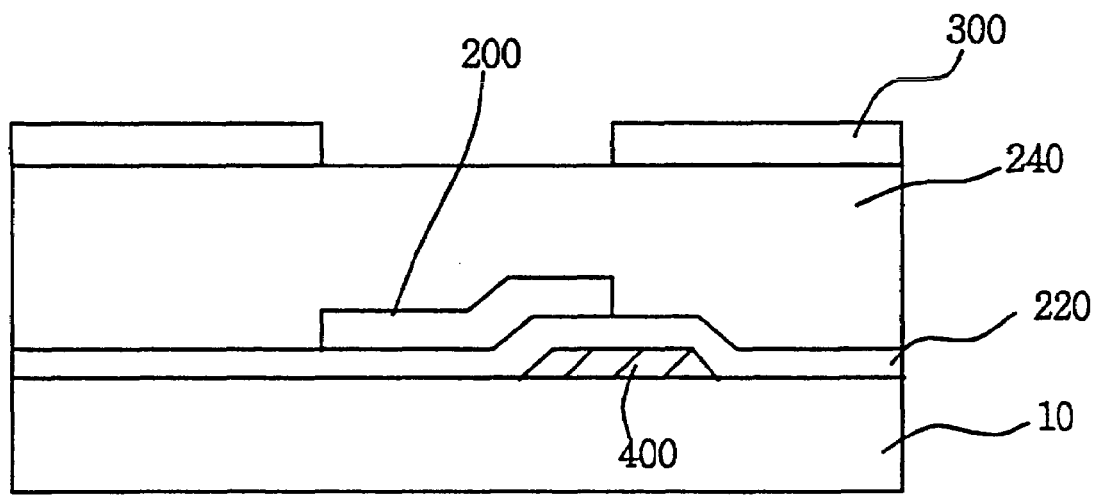
Figure 19A:
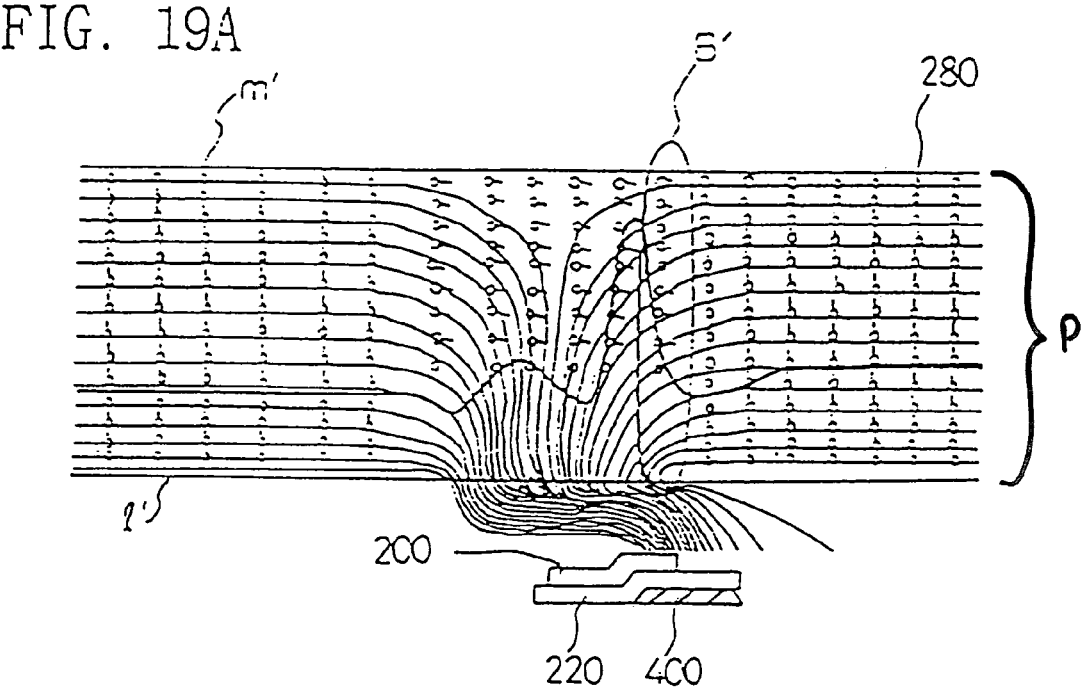
Figure 19B:
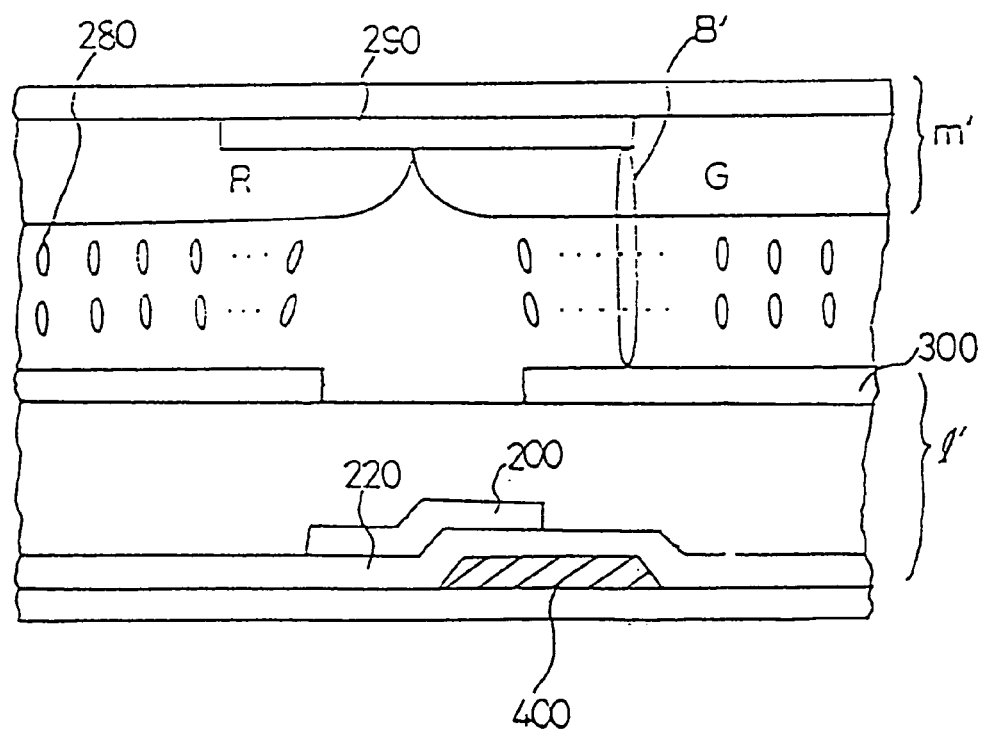
Figure 20A:
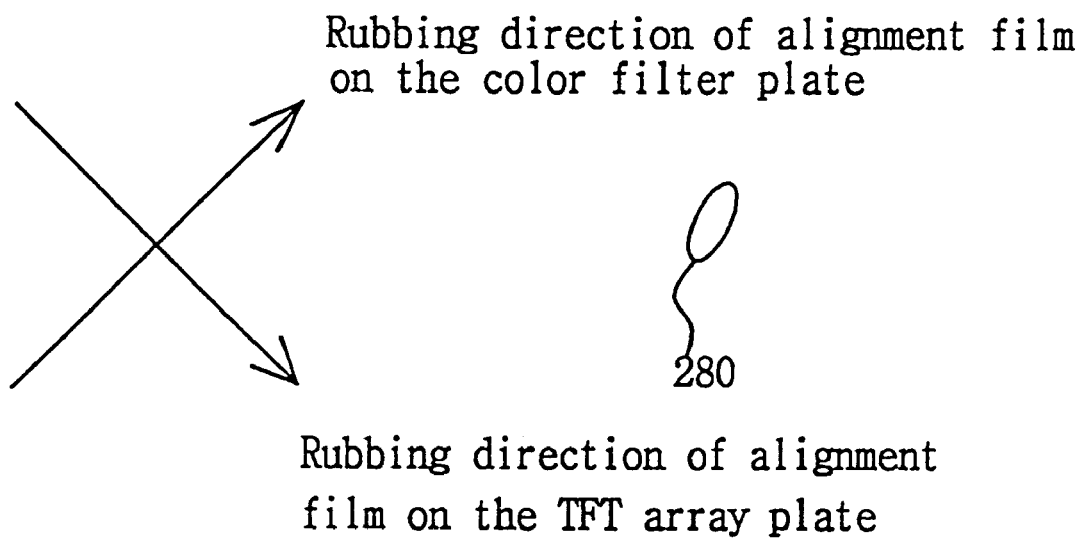
Figure 20B:
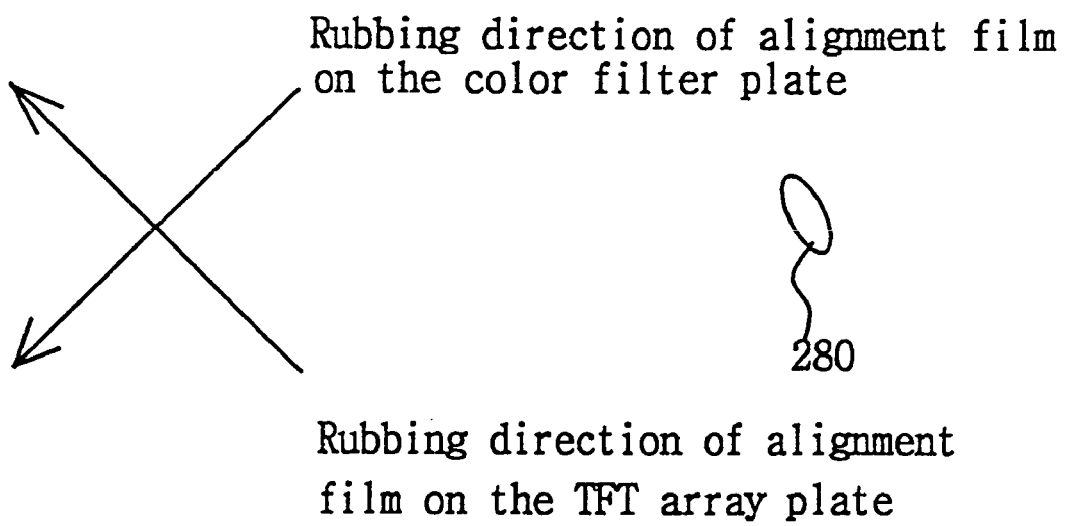

In the drawings:

FIG. 1 shows a layout of a unit pixel of a conventional TFT-LCD;

FIG. 2 is a cross-sectional view, which is bisected through the line I–I' in FIG. 1, of an LCD having a TFT with an inverse staggered structure according to a related art;

FIG. 3 shows a cross-sectional view bisected through the line II–II' in FIG. 1;

FIGS. 4A to 4C show cross-sectional views, which are bisected through the line II–II' in FIG. 1, of fabricating an LCD according to a related art;

FIG. 5A shows a graph of equipotential lines between a TFT array plate and a color filter plate in an LCD according to a related art, wherein a predetermined voltage is applied to the plates and illustrating the generation of a light-leakage region B when light is cut off by liquid crystals between the plates;

FIG. 5B shows a cross-sectional view of an LCD where a light leakage region is generated according to the related art;

FIG. 6 shows a layout of a unit pixel of a TFT-LCD according to a first embodiment of the present invention;

FIG. 7 is a cross-sectional view bisected through the line III–III' in FIG. 6;

FIG. 8 shows a cross-sectional view bisected through the line IV–IV' in FIG. 6;

FIG. 9 shows a cross-sectional view of an LCD according to a first embodiment of the present invention;

FIG. 10 shows a layout of a unit pixel of a TFT-LCD according to a second embodiment of the present invention;

FIG. 11 is a cross-sectional view of an LCD having a TFT with an inverse staggered structure according to a second embodiment of the present invention, which is bisected through the line III–III' in FIG. 10;

FIG. 12 shows a cross-sectional view bisected through the line I III–III–IV' in FIG. 10;

FIG. 13A shows a graph of equivalent potential lines between a TFT array plate and a color filter plate in an LCD according to a second embodiment of the present invention art, wherein a predetermined voltage is applied to the plates;

FIG. 13B shows a cross-sectional view of an LCD according to a second embodiment of the present invention;

FIG. 14 shows the width of a light leakage region corresponding to the overlapped area between a data line and a pixel electrode adjacent to the data line;

FIG. 15 shows a layout of a unit pixel of a TFT-LCD according to a third embodiment of the present invention;

FIG. 16 and FIG. 17 are cross-sectional views of an LCD bisected through the lines III–III' and IV–IV' in FIG. 15;

FIG. 18A to FIG. 18C show cross-sectional views of fabricating an LCD according a third embodiment of the present invention, which are bisected through the line IV–IV' in FIG. 15;

FIG. 19A shows a graph of equivalent potential lines between a TFT array plate and a color filter plate in an LCD according to a third embodiment of the present invention art wherein a predetermined voltage is applied to the plates;

FIG. 19B shows a cross-sectional view of an LCD according to a third embodiment of the present invention; and FIG. 20A and FIG. 20B show the directions of rubbing alignment films of a TFT array plate and a color filter plate in an LCD according to a third embodiment of the present invention.

DETAILED DESCRIPTION OF PREFERRED EMBODIMENTS

Reference will now be made in detail to the preferred embodiments of the present invention, examples of which are illustrated in the accompanying drawings.

FIG. 6 to FIG. 9 illustrate a first embodiment.

FIG. 6 shows a layout of a unit pixel of a TFT-LCD according to a first embodiment, FIG. 7 is a cross-sectional view bisected through the line III–III' in FIG. 6, FIG. 8 shows a cross-sectional view bisected through the line IV–IV' in FIG. 6, and FIG. 9 shows a cross-sectional view of an LCD according to a first embodiment.

Referring to FIG. 6 to FIG. 8, a gate line 100 is formed in a horizontal direction on a transparent substrate 1' as a TFT array plate on which a TFT and a pixel electrode are arranged. Data line 200 is formed perpendicular to the direction of gate line 100, which is insulated from the data line 200.

A gate electrode 140 protruding from the gate line 100 extends out in the same direction as the data line 200 is arranged.

An active layer 120, above which a gate insulating layer 220 shown in FIGS. 7–8 lies, is formed under the gate electrode 140. A source region 120a and a drain region 120c are defined at either side of a channel region in the active layer 120.

A source electrode 160, which protrudes from the data line 200 and is connected to the source region, and a drain electrode 180 connected to the drain region confront each other separately, in the same direction in which the gate line 100 is arranged.

An organic passivation layer 240, as shown in FIG. 7 and FIG. 8, covers the above structure. A contact hole exposing the drain electrode 180 is formed in the organic passivation layer 240. The organic passivation layer 240 may be formed by coating the above structure with an organic insulator such as acryl, BCB (benzocyclobutene) or the like.

A pixel electrode 300, which fills up the contact hole and is connected to the drain electrode 180, is formed on the organic passivation layer 240. The pixel electrode 300 overlaps a portion of the data line 200 by a width A', which is usually under 1.5 µm to increase the opening ratio, wherein the organic passivation layer 240, which is an insulating layer having a low dielectric constant, lies beneath the pixel electrode 300.

A color filter consisting of R (red), G (green) and B (blue) patterns, a black matrix 290 and a common electrode (not shown in the drawing) are fabricated in the color filter plate m', as shown in FIG. 9, according to the first embodiment.

In an LCD according to the first embodiment, liquid crystals 280 are injected to be sealed between the TFT array plate $\ell$ and the color filter plate m'. The black matrix 290 of the color filter plate m' has an asymmetrically-overlapped structure such that the black matrix 290 covers one portion of the data line 200 of the TFT array plate $\ell$ An alignment film (not shown in the drawing) is formed over the color filter and TFT array plates m' and $\ell$ Namely, when the plates m' and $\ell$ are being sealed, the black matrix 290 of the color filter plate m' exposes most of the TFT array plate $\ell$ except the TFT, the gate line 100 and the data line 200. In this case, the black matrix 290 is designed to partially overlap the data line 200.

The first embodiment, as shown in FIG. 6, thus has the asymmetrically-overlapped structure such that the data line 200 of the TFT array plate $\ell$ is overlapped by the pixel electrode 300 by the width A'.

Then, liquid crystals 280 between the color filter and TFT array plates m' and $\ell$ in the LCD of the first embodiment are aligned uniformly by carrying out a rubbing process of rubbing the alignment film with cloth or the like.

Once a predetermined voltage is applied to the TFT array and color filter plates $\ell$ and m', the working directions of the liquid crystals 280 are changed. Namely, as shown in FIG. 9, the region at which the light transmission is increased abruptly occurs from 1 µm to 2 µm near the pixel electrode 300 as the working directions of the liquid crystals 280 are changed due to the distortion of the liquid crystals 280 to predetermined degrees. The location of this light transmission region may be changed the from the right to the left of the data line in accordance with the direction of rubbing the alignment film.

As mentioned in the above description, this embodiment has the structure that the data line 200 is asymmetrically overlapped by the pixel electrode 300 and the black matrix 290. Thus, the region where the data line 200 is overlapped by the black matrix 290 actually blocks the above-mentioned region (which includes B') where the light transmission abruptly increases, to cut off light. Therefore, the light leakage region B' has no influence on the image quality.

FIG. 10 to FIG. 13B illustrates a second embodiment.

FIG. 10 shows a layout of a unit pixel of a TFT-LCD according to a second embodiment.

FIG. 11 is a cross-sectional view of an LCD having a TFT with an inverse staggered structure according to a second embodiment, which is bisected through the line III–III' in FIG. 10.

FIG. 12 shows a cross-sectional view bisected through the line IV–IV' in FIG. 10.

FIG. 13A shows a graph of equivalent potential lines between a TFT array plate and a color filter plate in an LCD according to a second embodiment wherein a predetermined voltage is applied to the plates.

FIG. 13B shows a cross-sectional view of an LCD according to a second embodiment.

FIG. 14 shows the width of a light leakage region corresponding to the overlapped width between a data line and a pixel electrode adjacent to the data line.

Referring to FIG. 10 to FIG. 13B, a gate line 100, as shown in FIG. 10 to FIG. 12, is formed in a horizontal direction on a transparent substrate 1' as a TFT array plate on which a TFT and a pixel electrode are arranged. A gate electrode 140 protruding from the gate line 100 extends out.

An active layer 120, underneath which a gate insulating layer 220 shown in FIGS. 11–12 lies, is formed over the gate electrode 140. A source region, a channel region and a drain region are defined in the active layer 120.

A data line 200, which is insulated from the gate line 100, is arranged cross the gate line 100. The data line 200 has a source electrode 160 and a drain electrode 180 which cover, respectively, the source and drain regions of the active layer 120.

An organic passivation layer 240 covers the above structure. A contact hole exposing the drain electrode 180 is formed in the organic passivation layer 240. The organic passivation layer 240 is formed with an organic insulator such as acryl, BCB (benzocyclobutene) or the like.

A pixel electrode 300 which fills up the contact hole and is connected to the drain electrode 180 is formed on the organic passivation layer 240. In this case, the pixel electrode 300, asymmetrically overlaps a data line 200 at both ends. As shown in FIG. 10, the width by which the pixel electrode 300' overlaps the data line 200 at one end of the pixel electrode is designated by the reference sign 'a'. The width a ranges from 2 to 4 µm. The other width, by the pixel electrode 300 overlaps the data line 200 at the other end of the pixel electrode, is designated by the reference sign 'b' and is less than 2 µm.

As mentioned in the above description, a light leakage region is formed at the left or right of the data line 200 in accordance with the direction of rubbing the alignment film. In order to block the light leakage region, the LCD according to the second embodiment has the overlapped structure wherein the data line 200 is overlapped by the pixel electrode 300 or 300' to a width of at least 2 µm.

A color filter consisting of R (red), G (green) and B (blue) patterns and a black matrix 290 are fabricated on the color filter plate m' in the LCD according to the second embodiment.

In the LCD according to the second embodiment, liquid crystals 280 are injected to be sealed between the TFT array plate $\ell$ and the color filter plate m'. An alignment film (not shown in the drawing) is formed in the color filter and TFT array plates m' and $\ell$ Liquid crystals 280 between the color filter and TFT array plates m' and $\ell$ are aligned uniformly by carrying out a process of rubbing the alignment film with cloth or the like. The liquid crystals 280 change the characteristics of light transmission, provided that a predetermined voltage is applied to the plates.

The LCD having the structure such that a pixel electrode asymmetrically overlaps a data line at both ends, as shown in FIG. 13A and FIG. 13B, produces no light leakage, as explained in the following description by referring to FIG. 13A and FIG. 13B.

FIG. 13A and FIG. 13B show a pattern of cutting off light due to the liquid crystal function when voltage is applied between the color filter and TFT array plates m' and *l* which are in a normally white mode. Curves between both plates m' and *l* are equipotential lines. Liquid crystals react with the equipotential lines perpendicularly. FIG. 13A also shows the graph "P" indicating the permeability of light in the device.

As shown in FIG. 13A and FIG. 13B, the curves are greatly distorted on the data line 200 as the voltage of the data line 200 influences the voltage applied to the liquid crystals 280. Thus, the region at which the light transmission is increased abruptly shows up 1 μm to 2 μm near the pixel electrode 300 as the working directions of the liquid crystals 280 are changed due to the distortion of the liquid crystals to predetermined degrees. Yet, light actually fails to penetrate due to the overlapped region between the data line 200 and its adjacent pixel electrode 300'.

Particularly, there is a potential difference at the light leakage region B' due to the distortion of the crystals to predetermined degrees. But, image quality actually is not affected as the light is blocked by the overlapped region between the data line 200 and the adjacent pixel electrode 300'.

The directions of the liquid crystals 280 are oriented by the rubbing directions of each alignment film of the TFT plate *l* and color filter plate m'. The location of the light transmission region may be changed from right to left, or vice versa, of the data line 200 in accordance with the direction of rubbing the alignment film.

In the LCD according to the second embodiment, as shown in FIG. 12, the overlapped width "a" between the data line 200 and the pixel electrode 300' adjacent to the one side of the data line 200 ranges from 2 to 4 μm. And, the other overlapped width "b" between the data line 200 and the pixel electrode 300 adjacent to the other side of the data line is less than 2 μm.

FIG. 14 shows the width of a light leakage region corresponding to the overlapped width between a data line and a pixel electrode adjacent to the data line.

Referring to FIG. 14, the overlapped width between the data line and the pixel electrode adjacent to the data line should be at least 2 μm at the region where the light leakage is generated. A maximum value of the opening ratio is attained because the width of the light leakage becomes 0 to prevent the light leakage provided that the width is 2.5 μm. When the overlapped width becomes greater than 4 μm, the opening ratio is reduced greatly. And, when the overlapped width becomes less than 2 μm, it is difficult to block the light leakage efficiently.

FIG. 15 shows a layout of a unit pixel of a TFT-LCD according to a third embodiment.

FIG. 16 and FIG. 17 are cross-sectional views of an LCD bisected through the lines III–III' and IV–IV' in FIG. 15.

FIG. 18A to FIG. 18C show cross-sectional views of fabricating an LCD according a third embodiment, which are bisected through the line IV–IV' in FIG. 15.

FIG. 19A shows a graph of equipotential lines between a TFT array plate and a color filter plate in an LCD according to a third embodiment wherein a predetermined voltage is applied to the plates.

FIG. 19B shows a cross-sectional view of an LCD according to a third embodiment.

FIG. 20A and FIG. 20B show the directions of rubbing alignment films of a TFT array plate and a color filter plate in an LCD according to a third embodiment.

A third embodiment will be explained in the following description by referring to FIG. 15 to FIG. 20B.

In an LCD according to a third embodiment, a gate line 100 is formed in a horizontal direction on a transparent substrate 1' as a TFT array plate on which a TFT and a pixel electrode are arranged. Data line 200 is formed perpendicular to the direction of the gate line 100.

A gate electrode 140 protruding from the gate line 100 extends out in the same direction as the data line 200 is arranged.

An active layer 120, above which a gate insulating layer 220 lies, is formed beneath the gate electrode 140. A source region 120a and a drain region 120b are defined at both sides of a channel region (which lies at the region corresponding to the gate electrode 140) in the active layer 120.

A source electrode 160, which protrudes from the data line 200 and is connected to the source region, and a drain electrode 180 connected to the drain region are formed respectively, each arranged in a same direction in which the gate line 100 is arranged.

A cut-off film 400, which is asymmetrically overlapped by the data line 200 to the left or right direction of the data line 200, is patterned below the data line 200.

An organic passivation layer 240 covers the above structure. A contact hole exposing the drain electrode 180 is formed in the organic passivation layer 240. A pixel electrode 300 connected to the drain electrode 180 through the contact hole is formed on the organic passivation layer. The pixel electrode 300 partially overlaps the data line 200 and the cut-off film 400.

A color filter, a black matrix and a common electrode are fabricated in the color filter plate m' of an LCD according to the third embodiment.

In an LCD according to the third embodiment, liquid crystals 280 are injected to be sealed between the TFT array plate *l* and the color filter plate m'.

A process of fabricating the LCD of the third embodiment will be explained in the following description.

Referring to FIG. 16 and FIG. 15A, after a metal layer has been formed by sputtering Al, Mo or the like, on a transparent substrate 1' such as glass, in which gate and data lines are defined, gate lines 100 are formed by patterning the metal layer.

In this case, a gate electrode 140 which protrudes from and the gate line 100 and a cut-off film 400, to be overlapped partially by the data line region, are patterned as soon as the gate line 100 is patterned. The gate electrode 140 and the cut-off film 400 are etched simultaneously by using the same etch mask.

After a gate insulating layer 220 is formed to cover the gate electrode 140, an amorphous silicon layer having been deposited successively, an active layer 120 is formed by patterning the amorphous silicon layer.

Referring to FIG. 18B, after a metal layer is formed on the above structure, data lines 200 are patterned by etching the metal layer. When the data lines 200 are patterned, source and drain electrodes 160 and 180 connected to the source and drain regions respectively are also patterned. In this case, the source and drain electrodes 160 and 180 are arranged to cross the gate line 100. The data line 200 is patterned to partially overlap the cut-off film 400.

An organic passivation layer 240 is formed to cover the above structure. The organic passivation layer 240 is formed with an organic insulator such as acryl, BCB (benzocyclobutene) or the like.

The organic passivation layer 240 which has excellent coverage enables the plate surface of an LCD to be planarized and reduces alignment degradation of liquid crystals due to the step difference. The dielectric constant of the organic passivation layer 240 is lower than that of an inorganic insulating layer. Thus, when an LCD having a high opening ratio is fabricated by forming a pixel electrode 300 overlapping the data lines 200 on the organic passivation layer 240, the degradations such as flickering images are prevented, as no voltage distortion due to parasitic capacitance at the overlap region between the data line 200 and pixel electrode 300 occurs.

When BCB is used for the organic passivation layer, a thermal treatment is carried out for an hour at 250° C. to 300° C. (the temperature is optimal at 280° C.) and then the surface of BCB is treated with an oxygen ashing process. These processes improves the adhesion between the organic passivation layer 240 and a transparent conductive layer to be formed, which prevents the erosion of the organic conductive layer during subsequent processes.

Referring to FIG. 18C, a contact hole exposing the drain electrode 180 is formed in the passivation layer 240.

After ITO (Indium Tin Oxide) has been deposited on the passivation layer 240, a pixel electrode 300 is formed by patterning the ITO to be connected to the drain electrode 180. The pixel electrode 300, as mentioned in the above explanation, has the structure overlapping the data line 200. The width of the overlap area is at least 1.5 μm. The data line 200 and the cut-off film 400 are overlapped by a respective pixel electrode 300 within a range between 2 μm and 4 μm.

When the overlap width between the pixel electrode 300, the data line 200 and the cut-off film 400 exceeds 4 μm, the opening ratio is reduced greatly. And, when the overlap width becomes less than 2 μm, it is difficult to block the light leakage efficiently. Thus, the fabrication of the TFT array plate is completed After liquid crystals 280 have been injected between the TFT array plate *l* and the color filter plate m' in which color filters and a black matrix are fabricated, an LCD of the third embodiment, as shown in FIG. 19A and FIG. 19B, is completed by carrying out a sealing process. In this case, an alignment film shown in the drawing) is formed on the color filter plate m' and the TFT array plate *l*

Liquid crystals between the color filter and TFT array plates are aligned uniformly by carrying out a process of rubbing the alignment film with cloth and the like.

As shown in FIG. 19A and FIG. 19B, the LCD having the structure such that the data line, the pixel electrode and the cut-off film are overlapped has no light leakage in the third embodiment.

FIG. 19A and FIG. 19B show a pattern of cutting off light because of the liquid crystal function when voltage is applied between the color filter and TFT array plates m' and *l* which are in a normally white mode. Curves between both plates m' and *l* are equipotential lines. Liquid crystals react with the equipotential lines perpendicularly. FIG. 19A also shows the graph "P" indicating the permeability of light in the device.

As shown in FIG. 19A and FIG. 19B, the curves are greatly distorted on the data line 200 as the voltage of the data line 200 influences the voltage applied to the liquid crystals 280. Thus, working directions of the liquid crystals are changed and the region at which the light transmission is increased abruptly shows up 1 μm to 2 μm near the pixel electrode. Yet, light actually fails to penetrate due to the cut-off film 400 under the data line 200 and the overlap region between the data line 400 and its adjacent pixel electrode.

Particularly, there is a potential difference at the light leakage region B' due to the distortion of the crystals to predetermined degrees. But, image quality actually is not affected as the light is blocked by the cut-of film 400.

In the LCD according to the third embodiment, it is preferred that the overlap width between the data line, the pixel electrode and the cut-off film should be from 2 μm to 4 μm. When the overlap width becomes greater than 4 μm, the opening ratio is reduced greatly. When the overlap width becomes less than 2 μm, it is difficult to block the light leakage efficiently.

Moreover, the working directions of the liquid crystals 280 are changed, as shown in FIG. 20A and FIG. 20B, in accordance with the rubbed direction of each alignment film on the color filter plate and the TFT array plate, which may change the location of the light leakage region to the left or right of the data line 200. Therefore, the location of the cut-off film may depend on the location of the light leakage region.

As mentioned in the above description, the first embodiment has the structure that the data line is overlapped asymmetrically by the pixel electrode and the black matrix. Thus, the region where the data line is overlapped by the black matrix actually blocks the light leakage. Therefore, the light leakage region around the data line is blocked by the overlap region in accordance with the direction of the alignment film.

In the second embodiment having the structure that the data line and both stages of the pixel electrode adjacent to the data line overlap asymmetrically, light is unable to be transmitted as the light leakage region at each side of the data line is cut off by the overlap region between the data line and the pixel electrode in accordance with the direction of rubbing the alignment film.

In the third embodiment, the light leakage caused by the rubbing direction is prevented by the cut-off film, as the cut-off film is overlapped by the data line and the pixel electrode asymmetrically.

Therefore, image quality and reliability of the product are improved as the light leakage is effectively prevented by the first to third embodiments.

It will be apparent to those skilled in the art that various modifications and variations can be made in a liquid crystal display and a fabricating method thereof of the present invention without departing from the spirit or scope of the inventions. Thus, it is intended that the present invention cover the modifications and variations of this invention provided they come within the scope of the appended claims and equivalents.

What is claimed is:

1. A liquid crystal display having a plurality of pixels, each pixel comprising:
   a gate line on a first transparent substrate;
   a data line arranged to cross the gate line wherein the gate line is insulated from the data line;
   a gate electrode protruding from said gate line near an area where said data line crosses said gate line;
   a thin film transistor having a source electrode connected to the data line and a drain electrode separated from the source electrode;
   a passivation layer covering the thin film transistor wherein a contact hole exposing a portion of the drain electrode is formed in the passivation layer;
   a pixel electrode on the passivation layer, the pixel electrode being connected to the drain electrode through the contact hole and partially overlapping the data line;

a black matrix, a color filter and a common electrode on a second transparent substrate, the black matrix being extended along the data line to overlap partially and asymmetrically with the data line; and liquid crystals provided and sealed between the first and second transparent substrates.

2. The liquid crystal display according to the claim 1, wherein a location where the black matrix overlaps the data line is selected according to a direction of rubbing an alignment film.

3. The liquid crystal display according to the claim 1, wherein the passivation layer is an organic passivation layer.

4. The liquid crystal display according to the claim 3, wherein the organic passivation layer is made of acryl.

5. The liquid crystal display according to the claim 3, wherein the organic passivation layer is made of BCB.

6. The liquid crystal display according to the claim 1, wherein a portion of the black matrix that partially overlaps the data line has a width of about at least 2 µm.

7. A liquid crystal display comprising:
a thin film transistor plate further comprising:
a gate line on a first transparent substrate,
a data line arranged to cross the gate line wherein the gate line is insulated from the data line,
a gate electrode protruding from said gate line near an area where said data line crosses said gate line,
a thin film transistor having a source electrode connected to the data line and a drain electrode separated from the source electrode wherein the source and drain electrodes confront each other;
a passivation layer covering the thin film transistor wherein a contact hole exposing a portion of the drain electrode is formed in the passivation layer; and
a pixel electrode on the passivation layer and being connected to the drain electrode through the contact hole, wherein the pixel electrode partially overlaps the data line;
a color filter plate including a black matrix, a color filter and a common electrode on a second transparent substrate; and
liquid crystals provided and sealed between the thin film transistor plate and the color filter plate,
wherein a cut-off film is formed under the data line, an edge portion of the cut-off film is overlapped by an edge portion of the data line, and an overlap length between the edge portion of the cut-off film and the edge portion of the data line is substantially the same as an overlap length between the pixel electrode and the data line.

8. The liquid crystal display according to claim 7, wherein the passivation layer is an organic passivation layer.

9. The liquid crystal display according to claim 7, wherein the cut-off film and the gate line are formed on a same level.

10. The liquid crystal display according to claim 7, wherein an overlap region between the pixel electrode, the cut-off layer and the data line has a width between 2 µm and 4 µm.

11. The liquid crystal display according to claim 7, wherein the cut-off film is formed at one side of the data line, said side selected according to a direction of rubbing an alignment film.

12. A method of fabricating a liquid crystal display having a transparent substrate on which a gate line region and a data line region are defined, comprising:
simultaneously forming a gate line in the gate region wherein a gate electrode protrudes from the gate line, and a cut-off film;
forming a data line in the data line region on the transparent substrate, wherein the data line crosses and is insulated from the gate line, and wherein a source electrode is formed at one side of the data line, and wherein a drain electrode is formed which confronts and is isolated from the source electrode;
forming a passivation layer covering the gate line region, the data line region and the cut-off film, wherein a contact hole exposing a portion of the drain electrode is formed in the passivation layer; and
forming a pixel electrode connected to the drain electrode through the contact hole on the passivation layer, the pixel electrode partially overlapping the data line,
wherein an edge portion of the cut-off film is overlapped by an edge portion of the data line, and an overlap length between the edge portion of the cut-off film and the edge portion of the data line is substantially the same as an overlap length between the pixel electrode and the data line.

13. The method according to claim 12, wherein the passivation layer is an organic passivation layer.

14. The method according to claim 12, wherein the cut-off film and the gate line are formed on a same level.

15. The method according to claim 12, an overlap region between the pixel electrode, the cut-off layer and the data line range has a width of between 2 µm and 4 µm.

16. A liquid crystal display comprising:
a first transparent substrate;
a gate line on the first transparent substrate;
a data line arranged to cross the gate line wherein the gate line is insulated from the date line;
a thin film transistor having a source electrode connected to the data line, a drain electrode separated from the source electrode, and a gate electrode connected to said gate line in an area where said data line crosses said gate line;
a passivation layer over the thin film transistor and having a contact hole exposing a portion of the drain electrode; and
a pixel electrode formed on the passivation layer and being connected to the drain electrode through the contact hole, the pixel electrode partially overlapping the data line;
a cut-off film under the data line, wherein an edge portion of the cut-off film is overlapped by an edge portion of the data line, and an overlap length between the edge portion of the cut-off film and the edge portion of the data line is substantially the same as an overlap length between the pixel electrode and the data line;
a second transparent substrate including a black matrix, a color filter and a common electrode; and
liquid crystals between the first and second transparent substrates.

* * * * *